United States Patent [19]

Schmidt et al.

[11] 4,264,122
[45] Apr. 28, 1981

[54] BINOCULAR OBSERVATION INSTRUMENT

[75] Inventors: Wilhelm Schmidt, Aalen-Hofen; Karl Grünvogel, Aalen, both of Fed. Rep. of Germany

[73] Assignee: Carl Zeiss-Stiftung, Oberkochen, Fed. Rep. of Germany

[21] Appl. No.: 79,369

[22] Filed: Sep. 27, 1979

[30] Foreign Application Priority Data

Oct. 7, 1978 [DE] Fed. Rep. of Germany ....... 2843835

[51] Int. Cl.³ .................. G02B 23/18; G02B 7/24
[52] U.S. Cl. .................................... 350/36; 350/75
[58] Field of Search .................. 350/75, 76, 71, 72, 350/36, 32, 18, 146, 145; D16/58, 59, 62, 63

[56] References Cited

U.S. PATENT DOCUMENTS

| 962,929 | 6/1910 | Straubel | 350/75 |
|---|---|---|---|
| 1,272,214 | 7/1918 | Camus | 350/36 |
| 2,826,114 | 3/1958 | Bryan | 350/75 |
| 2,935,910 | 5/1960 | Schmidt | 350/146 |
| 3,029,696 | 4/1962 | Schmidt | 350/72 |

FOREIGN PATENT DOCUMENTS

| 1339058 | 8/1963 | France | 350/75 |
|---|---|---|---|
| 13369 | of 1907 | United Kingdom | 350/75 |

*Primary Examiner*—Jon W. Henry
*Attorney, Agent, or Firm*—Hopgood, Calimafde, Kalil, Blaustein & Lieberman

[57] ABSTRACT

The invention contemplates a binocular observation instrument wherein two viewing tubes are pivotally connected for articulation about a first axis to adjust for interpupilary distance and wherein provision is made for further articulation about a second axis to enable adjustment of the angle between the respective optical axes of the two viewing tubes.

14 Claims, 2 Drawing Figures

4,264,122

BINOCULAR OBSERVATION INSTRUMENT

BACKGROUND OF THE INVENTION

The present invention relates to a binocular observation instrument of the variety in which the two tubes which contain the optical elements are connected with each other by a connecting bridge having a pivot pin for adjustment of the pupil distance.

Telescopes are known in which two individual telescopes are connected with each other by a single-pivot or double-pivot connecting bridge. The pivot axes are arranged parallel to the optical axes of the individual telescopes and make possible an adjustment of the pupil distance and a compact folding together of the telescope. In accordance with their design and development, telescopes are intended only for the observation of remote objects but not for viewing objects within working distance.

It is also already known from German Pat. No. 2,622,743 to arrange in front of the telescope a system which consists of supplementary lenses and deflecting means and thereby to expand the telescope into a microscope. Such a supplementary system is a separate structural part and as such is relatively expensive and not always at hand.

For very fine work in which the article to be worked is located within the working range and must be observed magnified, so-called binocular magnifiers are known. They consist of two tubes which contain the optical elements and are customarily cemented onto the eyeglasses of the observer arranged in an eyeglass frame. The pupil distance is in this case invariable and adapted to the observer, as is true also of the angle of convergence $\alpha$ between the optical axes of the tubes.

From U.S. Pat. No. 3,029,696, there is known a binocular magnifier in which the two tubes are so connected with an eyeglass frame that the pupil distance is adjustable by shifting the tubes in opposite directions along a straight line. This displacement is effected by actuating a central adjustable member. By means of the same adjustment member, adjustment of the angle of convergence $\alpha$ is also possible. In this case, each change in the pupil distance requires a readjustment of the angle of convergence $\alpha$. Furthermore, the levers and gears necessary for transmitting the adjustment movements to the tubes make these binocular magnifiers expensive and heavy.

BRIEF STATEMENT OF THE INVENTION

The object of the present invention is to provide a binocular observation instrument having two tubes containing the optical elements, which instrument is adjustable to different working distances and different pupil distances, in which an adjustment of the pupil distance does not affect a given adjustment or setting of working distance, and which is characterized by simple construction and simple operation.

This object is achieved in accordance with the present invention, starting from an observation instrument in which two tubes are connected with each other by a connecting bridge with a pivot pin for adjustment of the pupil distance, in such manner that pivots are also provided in the connecting bridge for adjusting the angle of convergence $\alpha$ between the optical axes of the tubes. In this connection, it is advantageous to make the angle of convergence $\alpha$ adjustable, commencing with the value 0.

In the new observation instrument, by swinging the tubes about additional pivots in the connecting bridge, the optical axes of the tubes may be so inclined to the pivot pin that they intersect in the extension of said pin. By this adjustment of the angle of convergence $\alpha$, the working distance is determined and can remain fixed. If the pupil distance is now to be changed, the two tubes are bodily shifted about the pivot pin in the connecting bridge, their optical axes moving on a conical surface around the pivot pin. The angle of convergence $\alpha$ and the point of intersection of the optical axes are retained, i.e., the set working distance remains unaffected.

It is advantageous to develop the two tubes as a telescopic system so that the observation instrument can be used as ordinary field glasses, i.e., with an angle of convergence $\alpha$ of 0°. The same instrument can be used for the magnified viewing of objects within working distance by inclining the two tubes with respect to each other, supplementary lenses being provided in front of the tubes.

If the two tubes are developed primarily as magnifier systems, they also can be used as field glasses, by employing an angle of convergence $\alpha$ of 0° and using suitable supplementary lenses.

When working with the new observation instrument, it is necessary to have one's hands free. For this reason, the connecting bridge carries a spherical extension facing the observer in order to attach the instrument to a headband worn by the observer. Instead of a headband, a correspondingly developed eyeglass frame can also be provided.

DETAILED DESCRIPTION

Figure 1:
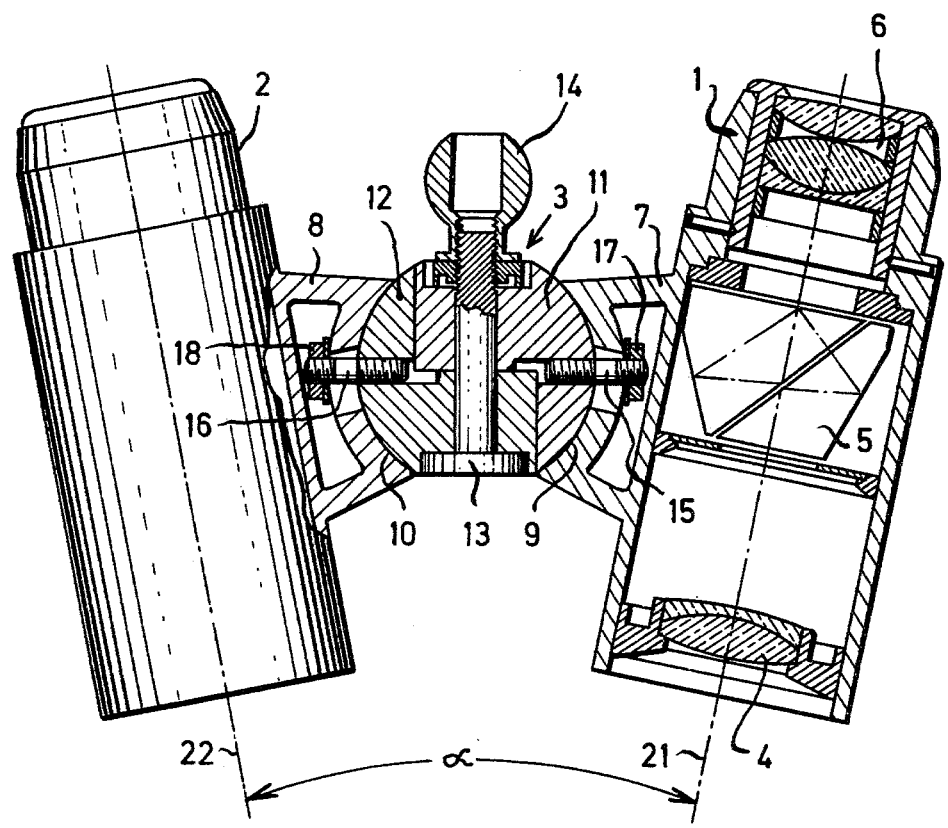
Figure 2:
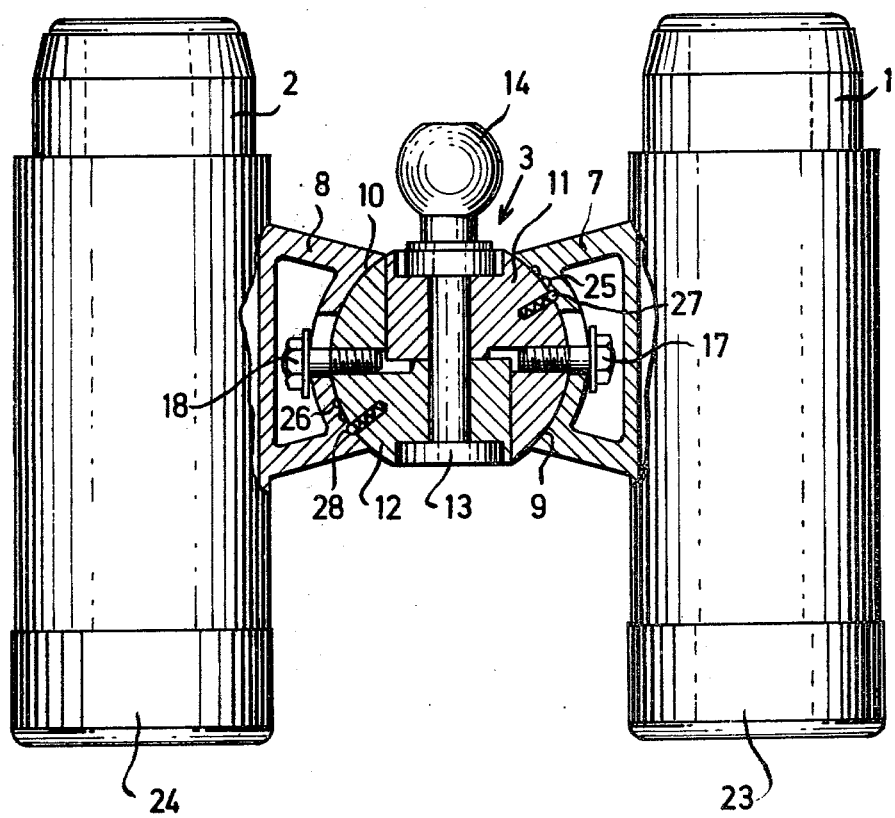

The invention will be described in further detail with reference to FIGS. 1 and 2 of the accompanying drawings, in which:

FIG. 1 is a plan view, partly broken-away and in section, of an illustrative embodiment of the observation instrument of the invention, shown for use as a binocular magnifier; and FIG. 2 is a similar view of another illustrative embodiment, shown adjusted for use as field glasses.

The observation instrument shown in FIG. 1 consists of the two individual tubes 1 and 2 which are connected with each other by a connecting bridge 3. In the example shown in the figure, each of the tubes 1 and 2 contains a magnifier system, as is shown in connection with the tube 1. This optical system consists in each case of an objective 4, a reflecting prism 5, and an ocular 6.

The tubes 1 and 2 are provided with extensions 7 and 8, each of which is developed as a cylindrical bearing shell (9 and 10, respectively) on the sides thereof facing the connecting bridge 3. The connecting bridge 3 itself consists of the two parts 11 and 12 whose ends facing the tubes 1 and 2 are cylindrical and cooperate with the bearing shells 9 and 10. The two parts 11 and 12 are connected to each other by a pivot pin 13 about which the two tubes 1 and 2 can be bodily shifted. A spherical extension 14 on pin 13 serves to attach the observation instrument, for instance, to a headband worn by the user.

The two parts 11 and 12 of the connecting bridge 3 contain pins 15 and 16 which pass through slots in the bearing shells of the extensions 7 and 8 and are provided with screw nuts 17 and 18. Instead of the screw nuts 17 and 18 manually adjusted knurled disks can also be provided.

In order to adjust the observation instrument to a given working distance, the two tubes 1 and 2 are swung about the common cylindrical axis of bearing elements 9, 11 and 10, 12 in such manner that their optical axes 21 and 22 intersect at a point which lies in the geometric extension of the axis of the pivot pin 13. The optical axes 21, 22 then form an angle of convergence α. When this adjustment has been completed, the two screw nuts 17, 18 are tightened, and the working distance which has been adjusted is thereby locked.

Once the working distance has been adjusted and locked, the pupil distance can be changed by swinging the two tubes 1 and 2 about the pivot pin 13 without this having any effect on the set angle of convergence α.

In the embodiment shown in FIG. 2, the two tubes 1 and 2 are arranged in parallel, i.e., they form an angle of convergence α of 0°. The observation instrument can then be used as field glasses, in which case attachment parts 23 and 24 are placed on the tubes 1 and 2 respectively, said parts containing supplementary lenses.

In FIG. 2, the two extensions 7 and 8 of the tubes 1 and 2 are provided with detent recesses 25 and 26 in their bearing shells 9 and 10. Each of the two parts 11 and 12 of the connecting bridge 3 carries a ball (27 and 28, respectively) under spring action and engageable into corresponding recesses 25, 26. In this way, the position shown for the working distance ∞ can easily be found as a detent position and locked. Similarly, given preselected shorter work distances can easily be found by the other detents shown. For locking, it is sufficient for the screw nuts 17 and 18 to be tightened to such an extent that the pivots (9, 11 and 10, 12 respectively) are still movable and the detents (25, 27 and 26, 28 respectively) effect the final locking.

Although FIG. 1 has been described for the situation in which the bearing surfaces 9 and 10 are cylindrical about an axis perpendicular to pin 13, it will be understood that FIG. 1 can also be taken to illustrate a modification wherein the bearing shell surfaces 9 and 10 of the extensions 7 and 8 are concave spherical and wherein the coacting parts 11 and 12 of the connecting bridge 3 are convex spherical, thus providing ball-joint suspension of the respective tubes 1 and 2 with respect to bridge 3. These ball joints permit, on the one hand, a swinging of tubes 1 and 2 about a first axis which is perpendicular to the plane of the paper of FIG. 1 and which passes through the pivot pin 13, i.e., an adjustment of the angle α, and on the other hand, a rotational swinging of each tube about a second axis, namely the respective axes of pins 15, 16, perpendicular to the axis of pivot pin 13. In this way, in case of an unsuitable adjustment of optical elements in tubes 1 and 2, a proper adjustment can be obtained mechanically by swinging the tubes as necessary about either or both of said first and second axes.

What is claimed is:

1. In a binocular observation instrument in which two spaced optical viewing tubes are interconnected by bridge elements that are pivoted to each other to permit adjustment for interpupilary distance, the improvement in which each tube is pivotally connected to a different one of said bridge elements, each pivotal connection of a bridge element to a tube being about an axis which is substantially perpendicular to the pivot axis of bridge-element interconnection, whereby the angle between optical axes of said tubes may be adjusted.

2. The improvement of claim 1, in which the pivotal adjustability of each of said tubes with respect to its associated bridge member is about a common axis which perpendicularly intersects the axis of bridge-element interconnection.

3. The improvement of claim 2, in which the pivotal connection of each of said tubes with respect to its associated bridge member includes coacting concave and convex sliding surfaces which are cylindrical about said common axis.

4. The improvement of claim 2, in which the pivotal connection of each of said tubes with respect to its associated bridge member includes coacting concave and convex sliding surfaces which are spherical about a common center at intersection of said common axis with the axis of bridge-element interconnection.

5. The improvement of claim 1, in which the range of adjustment angle between optical axes of said tubes includes zero degrees.

6. The improvement of claim 1, in which each pivotal connection of a bridge element to a tube is provided with means for locking a given angle set.

7. The improvement of claim 1, in which each pivotal connection of a bridge element to a tube comprises coacting concave and convex spherical surfaces, the centers for all spherical surfaces being at the same point on the axis about which said bridge elements are pivotally connected.

8. The improvement of claim 1, in which each pivotal connection of a bridge element to a tube comprises a coacting pair of coaxial concave and convex cylindrical surfaces, the axes of all cylindrical surfaces being in common and having perpendicular intersection with the axis about which said bridge elements are pivotally connected.

9. The improvement of claim 8, in which each bridge element includes a radially outwardly projecting pin on an axis perpendicular to the bridge-element interconnection axis and to the common axis of the cylindrical surfaces, each of the convex cylindrical surfaces being structurally a part of its associated tube and having a slot to permit a range of pin-in-slot displacement in the course of adjustment about the common axis, and locking means for securing a selected pin-in-slot relation for locking the adjusted position of the tubes.

10. The improvement of claim 8, and including detent means associated with each of the coacting pairs of cylindrical surfaces, for detent-retention of one or more predetermined angular relations between optical axes of the tubes.

11. The improvement of claim 1, in which each of the viewing tubes includes means adapted for application of a supplementary lens.

12. The improvement of claim 1, in which externally projecting means on the observer end of the bridge-connection pivot axis is adapted for selective attachment of the instrument to a headband worn by the observer.

13. A binocular observation instrument in which two tubes containing the optical elements are connected with each other by a connecting bridge having a pivot pin for the adjustment of the pupil distance, characterized by the fact that furthermore pivots (9, 11 and 10, 12) are provided in the connecting bridge (3) for adjusting the angle of convergence (α) between the optical axes (21, 22) of the tubes (1, 2), that the pivots (9, 11 and 10, 12) for setting the angle of convergence (α) are provided with means (15, 17 and 16, 18) for locking a given angle set, that the ends of the connecting bridge (3) which face the tubes (1, 2) are of spherical development, the center point of the sphere lying on the pivot pin (13), and that each tube (1, 2) bears an extension (7, 8) having a hollow spherical bearing shell (9, 10) which cooperates with the spherical ends (10, 12) of the connecting bridge (3).

14. A binocular observation instrument in which two tubes containing the optical elements are connected with each other by a connecting bridge having a pivot pin for the adjustment of the pupil distance, characterized by the fact that furthermore pivots (9, 11 and 10, 12) are provided in the connecting bridge (3) for adjusting the angle of convergence (α) between the optical axes (21, 22) of the tubes (1, 2), that the ends of the connecting bridge (3) which face the tubes (1, 2) are cylindrical, the cylinder axis being perpendicular to the pivot pin (13), that each tube (1, 2) bears an extension (7, 8) with a cylindrical bearing shell (9, 10) which cooperates with the cylindrical ends (10, 12) of the connecting bridge (3), that the connecting bridge (3) contains two pins (15, 16) which extend through slots in the bearing shells (9, 10) of the tubes (1, 2) and that resilient elements (27, 28) are provided which engage in recesses (25, 26) corresponding to predetermined angles of convergence (α).

* * * * *